Sept. 23, 1930.  W. FERRIS  1,776,765
FEED BRAKE FOR MILLING MACHINES AND THE LIKE
Filed Aug. 5, 1926   2 Sheets-Sheet 1
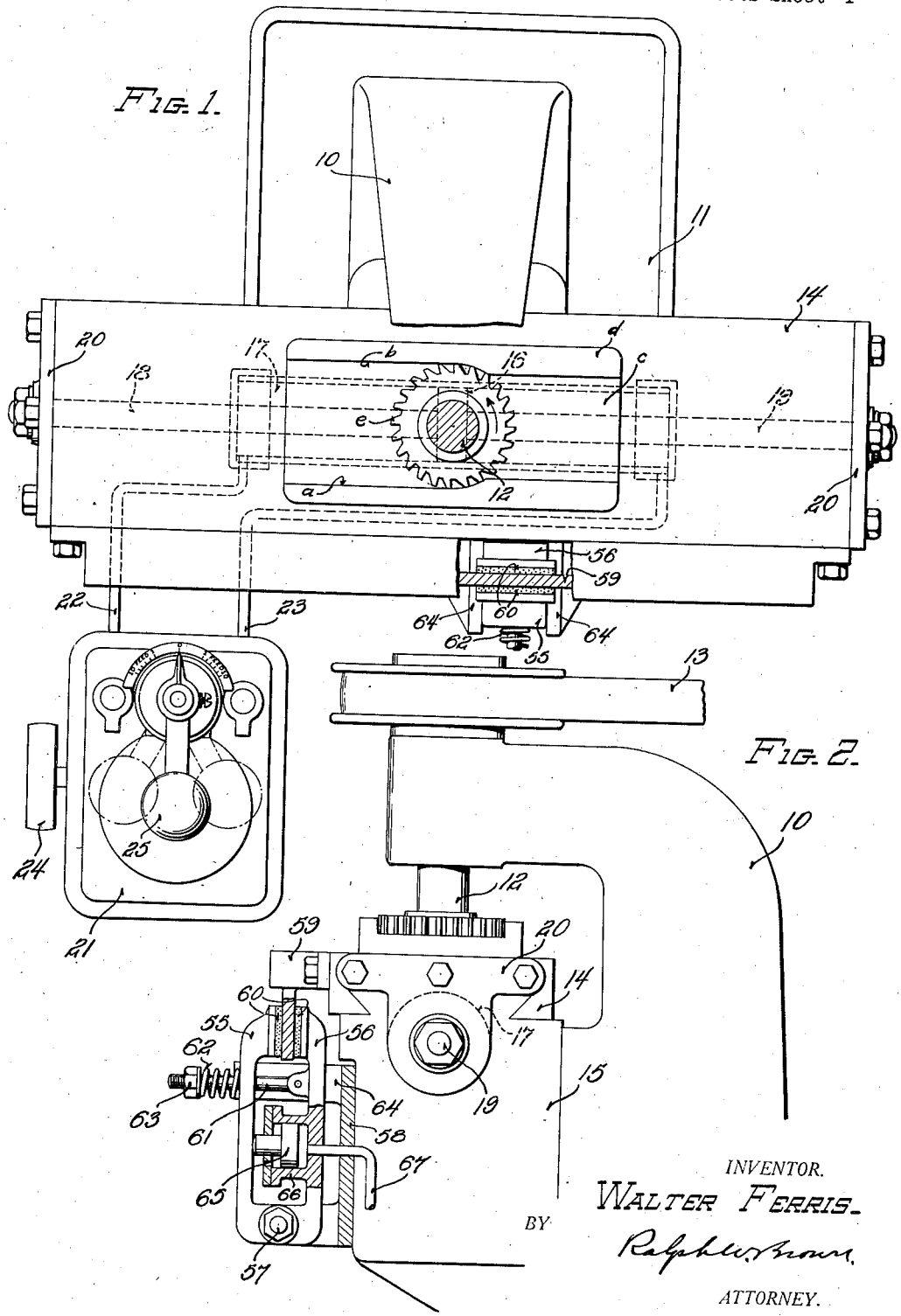
INVENTOR.
WALTER FERRIS
BY
ATTORNEY.

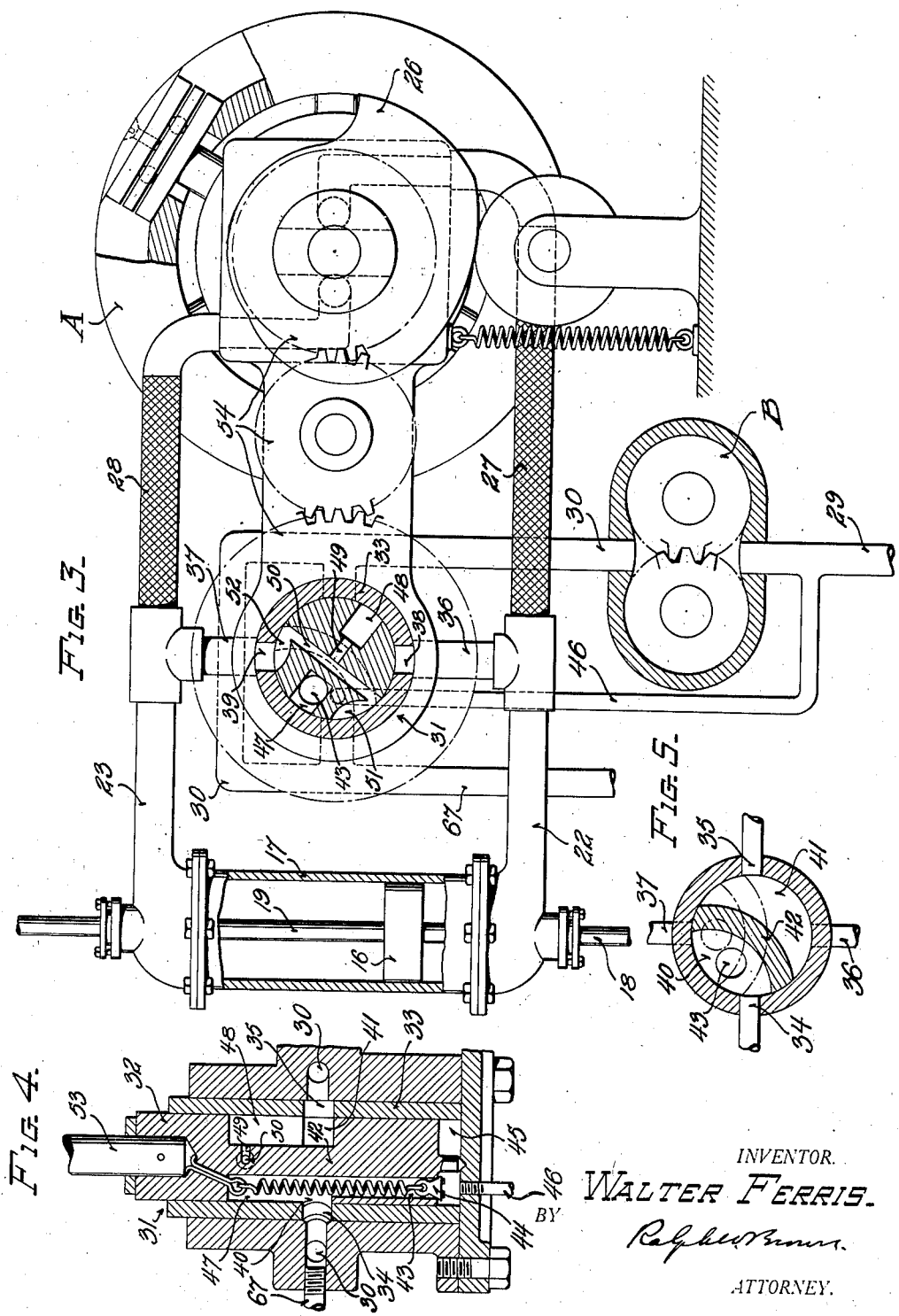

Patented Sept. 23, 1930

1,776,765

UNITED STATES PATENT OFFICE

WALTER FERRIS, OF MILWAUKEE, WISCONSIN, ASSIGNOR TO THE OILGEAR COMPANY, OF MILWAUKEE, WISCONSIN, A CORPORATION OF WISCONSIN

FEED BRAKE FOR MILLING MACHINES AND THE LIKE

Application filed August 5, 1926. Serial No. 127,309.

This invention relates to milling machines and the like.

In milling machines as ordinarily constructed it has been the universal practice to cut against the direction of feed in order to avoid tool breakage. Otherwise the tool tends to advance the work ahead of the normal feed motion, thus taking up any slack or back lash that may exist in the feed mechanism, and producing an irregular motion destructive to the tool. Under some conditions it is impossible however to insure opposition between the cutting and feeding forces. In some classes of work, for instance, it is highly desirable to use a rotary cutter which engages the work at opposite sides of the axis of the cutter. In such cases one side or the other of the cutter acts with, rather than against, the feed, and no milling machine on the market is capable of performing such work reliably without danger to the cutter.

One object of the present invention is the provision in a milling machine or the like of means for insuring a smooth feed motion irrespective of the direction of the cutting force. This I accomplish by the use of mechanism capable of applying an artificial frictional drag to the table, so as to offer a definite and preferably adjustable force in opposition to the normal feeding force. In practice this force is of sufficient magnitude to counteract any advancing effect produced by the cutting action.

Another object is the provision of brake mechanism for this purpose automatically operable to reduce the braking action during rapid traverse movements of the table.

Other objects and advantages will appear from the following description of an illustrative embodiment of the present invention.

For purposes of explanation the invention is shown and will be described as applied to the table of a hydraulically fed milling machine, although the same may be used to advantage with mechanically fed milling machines and other types of machine tools.

In the drawings:—

Figure 1 is a plan view of a milling machine embodying the present invention.

Fig. 2 is a side elevation.

Fig. 3 is a diagrammatic illustration of a hydraulic feed employed.

Fig. 4 is a vertical sectional view of the distributing valve shown in Figure 3.

Fig. 5 is a horizontal sectional view of the valve taken substantially along the line 5—5 of Figure 4.

The milling machine shown in Figures 1 and 2 comprises the usual column 10, rising from the base 11, and supporting the tool spindle 12 in the usual manner. The spindle in this instance is driven through a belt and pulley 13 from an appropriate power source. The machine shown also includes the usual lengthwise reciprocating table 14, carried by a knee 15, mounted for vertical adjustment in a well known manner on the face of the column.

The table is driven by a piston 16 closely fitted for reciprocation within a cylinder 17, firmly anchored within the knee beneath the table. Piston rods 18 and 19, projecting from the opposite ends of the cylinder, are respectively connected with appropriate brackets 20 fixed to and depending from the opposite ends of the table. The piston 16, and consequently the table, is driven in one direction or the other by liquid supplied to the cylinder from an appropriate source. In this instance a pump 21 is employed, the pump being connected to the opposite ends of the cylinder through pipes 22 and 23.

The pump shown is a constant speed, variable displacement, reversible flow pump of the type fully described in my copending application, Serial No. 460,184, filed April 11, 1921. It comprises two pump elements A and B, both operated at constant speed through a pulley 24 and both controlled by a hand lever 25. The pump element A is of the variable displacement, whose displacement may be varied from zero to a maximum in either direction by a rotary cam 26. This pump element is permanently connected to the pipes 22 and 23 through pipes 27 and 28, respectively. The other pump element B is a constant displacement gear pump, which receives liquid through a pipe 29 and discharges through a pipe 30. The discharge through pipe 30 is controlled by a distributing valve 31.

Valve 31 comprises a substantially cylindrical plug 32, fitted for rotation in an appropriate bushing 33. Pipe 30 is in open communication with two ports 34 and 35 through the wall of the bushing, and pipes 22 and 23 communicate through pipes 36 and 37, respectively, with ports 38 and 39 through the wall of the bushing, in a plane above ports 34 and 35. That portion of the plug 32 adjacent the ports 34 and 35 is cut away to provide two chambers 40 and 41, separated by an arcuate partition 42. A duct 43, in open communication with chamber 40 and controlled by a low pressure relief valve 44, discharges into a chamber 45 in the lower end of the bushing 33, from which liquid may discharge through a pipe 46 into the intake pipe 29 of the gear pump. An open channel 47 leads upwardly from chamber 40 into the plane of the ports 38 and 39. A second open channel 48 leads upwardly from chamber 41 into the plane of ports 38 and 39 and communicates through a passage 50 connecting two side pockets 51 and 52 lying in the plane of ports 38 and 39.

The valve 31 is connected through a stem 53 with the control lever 25, and the cam 26 is connected to the stem through appropriate gearing 54, so that the valve and cam respond to movements of the lever. Since this entire pump mechanism and hydraulic connections are fully described in the application above mentioned a more detailed description thereof is deemed unnecessary. It will suffice here to say that when the control handle 25 is in neutral full-line position of Figure 1, the displacement of pump element A is zero, and there is no flow of liquid in pipes 22 and 23, so that the piston 16 and table 14 are at rest. By swinging the lever 25 in either direction toward either of the dotted line positions of Figure 1, the pump element A sets up a flow of liquid in pipes 22 and 23 in a direction and at a rate dependent upon the direction and extent of movement of the control lever from the neutral position. All normal operating feed movements of the table are effected by movement of the lever within this range, that is: between the dotted line positions of Figure 1. In all positions of the lever within this range the pipe 30 leading from the gear pump B is open to the chamber 40 and passage 43 so that the pressure within pipe 30 is determined by the low pressure relief valve 44. In order to effect rapid movement of the table in either direction the control lever 25 is swung in one direction or the other, beyond the dotted line positions of Figure 1, into a position at right angles to the neutral full line position. This causes the valve 31 to assume the dotted line position of Figure 5, in which position chamber 40 and passage 43 no longer communicate with the pipe 30, and the entire delivery of the gear pump B is directed into one or the other of the pipes 22 or 23 to increase the flow therein, and thereby increase the speed of movement of the table. Since, in this position of the valve 31, the pipe 30 is no longer exposed to the low pressure relief valve 44, the pressure therein increases to the working pressures in the main circuit.

As hereinabove mentioned the present invention provides for the application of an artificial frictional drag to the table by which a smooth feed motion is assured regardless of the direction of the cut. This is accomplished in the machine shown by a brake mechanism such as will now be described. The brake shown in Figures 1 and 2 comprises a pair of cooperating jaws 55 and 56, each rockably mounted upon a horizontal pivot 57, rigidly supported by an appropriate bracket 58 fixed to the knee 15. A plate 59, fixed to and extending longitudinally of the table 14, is gripped between the friction faces 60 of the jaws. A yielding pressure is maintained between the jaws by any appropriate means such as a spring loaded tension bolt 61. The bolt is shown connected at one end to jaw 56 and extending through the other jaw 55, a spring 62 being interposed between the jaw 55 and a nut 63 threaded on the bolt. By adjusting the nut 63 the tension in spring 62 may be varied to thereby obtain any desired gripping pressure between the jaws and plate. The jaws are preferably braced against the drag of the table by confining them between a pair of stops 64 projecting from the bracket 58.

Provision is also preferably made for automatically reducing the gripping pressure between the jaws during the rapid idle strokes of the table. To this end a piston 65 and cylinder 66 are interposed between the jaws in such manner as to oppose the tension in the bolt 61. The cylinder is shown fixed to jaw 56, and the piston therein bears against the other jaw 55. A pipe 67 maintains communication between the cylinder and the pipe 30 leading from the gear pump, so that the pressure in the cylinder corresponds to the pressure in pipe 30.

A typical operation will now be briefly described. Let it be assumed that it is desired to finish off the opposite walls $a$ and $b$ of a slot $c$ in a work piece $d$, by passing a rotary cutter $e$ through the slot. Let it also be assumed that the cutter is rotated counter-clockwise, and that the table 14 and work piece $d$ are fed from right to left during the cutting action, as indicated by the arrows in Figure 1. It will be noted that the cutting force is applied to the wall $b$ of the slot in the direction of the feed motion, and that the cutting force is applied to the wall $a$ in a direction opposed to the feed motion. If the cutting forces are unbalanced and the wall *b* is receiving the heavier cut, the cutter tends to advance the work ahead of the normal feed motion. To counteract this effect the tension in spring 62 is so adjusted that the frictional resistance between the jaw faces 60 and plate 59, sets up a force in opposition to the feeding force, and in excess of the maximum resultant cutting force applied to the table. A working tension is thus maintained in the feed mechanism, and all possibility of an irregular feed motion is eliminated.

As hereinabove pointed out the pipe 30, leading from the gear pump B, is always open to the low pressure valve 44 during working feed movements of the table, so that a relatively light pressure is maintained in the brake releasing cylinder 66. The tension in spring 62 is sufficient however to maintain the desired frictional drag, in spite of the light releasing pressure thus maintained by the piston 65 and cylinder 66. After the cutter has passed through the work the table is returned at high speed to its initial position by swinging the control lever 25 into one of the extreme positions hereinabove described. The valve 31 is thus so adjusted as to disconnect pipe 30 from the low pressure relief valve 44, and to connect the same to pipe 22 constituting the working side of the main circuit. The resulting increased pressure set up in the pipe 30 is immediately transmitted to the cylinder 66, thereby causing an automatic reduction in the gripping pressure between the jaws 60 and plate 59. It will thus be noted that during rapid movements of the table, the hydraulic pressure in the main circuit, necessary to drive the table against the resistance of the brake, serves automatically to reduce the braking pressure.

Various changes may be made in the embodiment of the invention hereinabove specifically described without departing from the invention as defined in the appended claims.

I claim:

1. In a milling machine the combination of a tool support, a work support, means for driving one of said supports to effect a feed motion between the tool and work, and brake mechanism for said driven support operable to effect a predetermined frictional resistance to movement thereof to thereby maintain a working tension in said driving means irrespective of the reaction between the tool and work.

2. In a milling machine the combination of a tool support, a work support, means for driving one of said supports to effect a feed motion between the tool and work, brake mechanism for resisting the movement of said driven support, yieldable means for applying said brake mechanism, and means for adjusting said brake applying means to regulate said resistance.

3. In a milling machine the combination of a tool support, a work support, means for driving one of said supports to effect a feed motion between the tool and work, brake mechanism for resisting the movement of said driven support, resilient means for applying said brake mechanism, and means for adjusting said resilient means to regulate said resistance.

4. In a milling machine or the like the combination of a tool support, a work support, means for driving one of said supports to effect a feed motion between the tool and work, brake mechanism for resisting movement of said driven support, yieldable means for applying said brake mechanism, and means for opposing said brake applying means to reduce the braking pressure.

5. In a milling machine or the like the combination of a tool support, a work support, means for driving one of said supports to effect a feed motion between the tool and work, brake mechanism for resisting movement of said driven support, yieldable means for applying said brake mechanism, and means automatically operable during rapid movements of said driven support for opposing said yieldable means to thereby automatically reduce the resistance offered by said brake mechanism.

6. In a milling machine or the like the combination of a tool support, a work support means for driving one of said supports to effect a feed motion between the tool and work, brake mechanism for resisting movement of said driven support, and means automatically operable to vary the resistance offered by said brake mechanism.

7. In a milling machine or the like the combination of a tool support, a work support, means for driving one of said supports to effect a feed motion between the tool and work, brake mechanism for resisting movement of said driven support, control mechanism for said driving means, and means controlled by said control mechanism for automatically adjusting said brake mechanism.

8. In a milling machine or the like the combination of a tool support, a work support, means for driving one of said supports relative to the other to effect a feed motion between the tool and work, means coacting with said driven support to yieldably resist movement thereof, means for controlling said driving means, and means controlled by said last named means for automatically varying said resistance means.

9. In a milling machine or the like the combination of a tool support, a work support, feed mechanism for one of said supports, means for yieldably resisting movement of said last named support, and means associated with said feed mechanism for automatically adjusting said resistance means.

10. In a machine tool the combination of a movable support, feed mechanism therefor, means for yieldably resisting movement of said support under the action of said feed mechanism, and fluid actuated means for regulating said resisting means.

11. In a machine tool the combination of a movable support, hydraulic means for driving said support, means for yieldably resisting movement of said support under the action of said driving means, hydraulic means for regulating said resisting means, and means for connecting said last named means with said driving means to render the same responsive to pressures therein.

In witness whereof, I hereunto subscribe my name this 31st day of July, 1926.

WALTER FERRIS.